Figure 1:
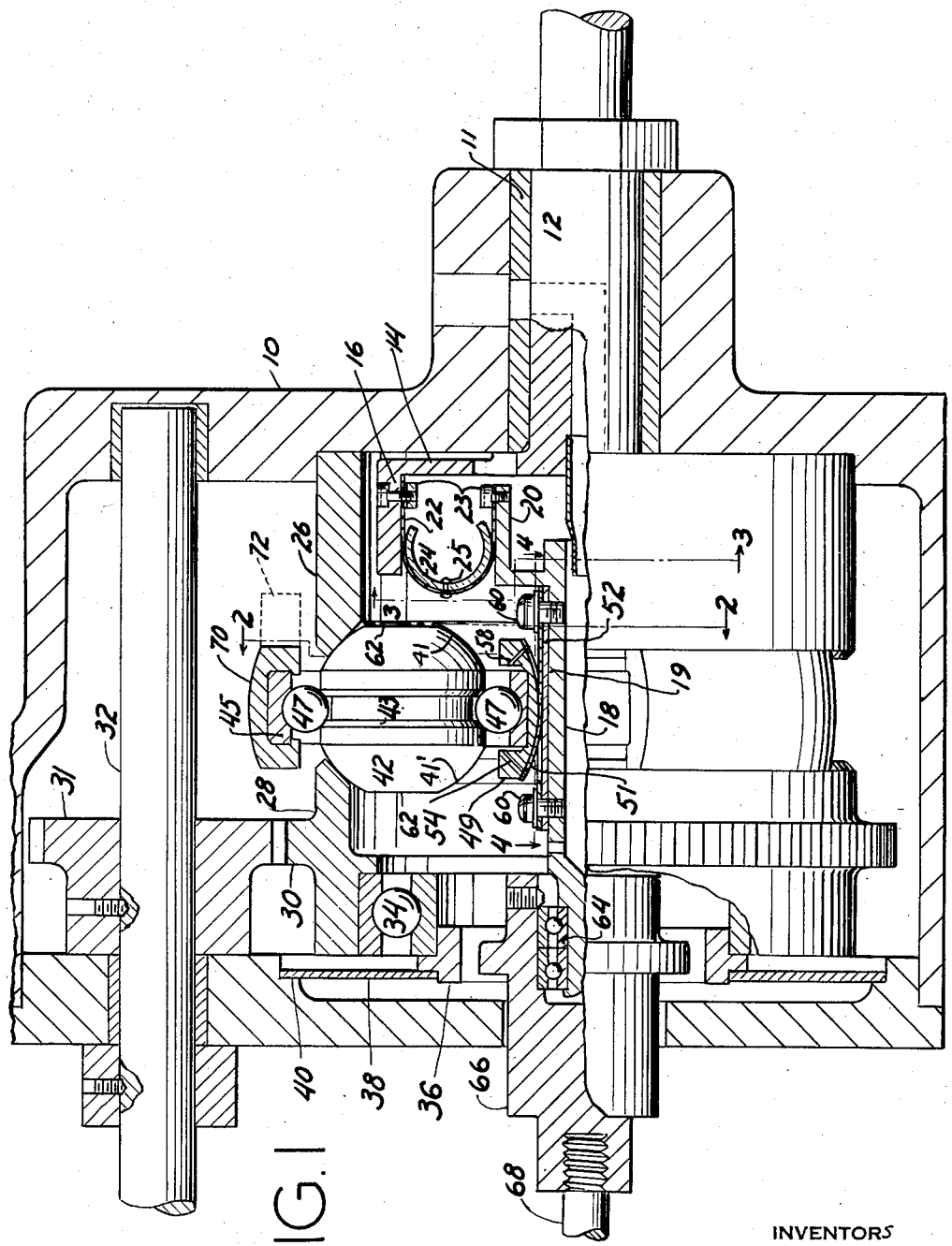

Nov. 18, 1958

E. K. HINE ET AL 2,860,530

BALL SPEED CHANGERS

Filed Oct. 29, 1954

3 Sheets-Sheet 1

INVENTORS
CHARLES W. CHILLSON & EDWARD K. HINE
BY
*Godfrey B. Spein*
ATTORNEY

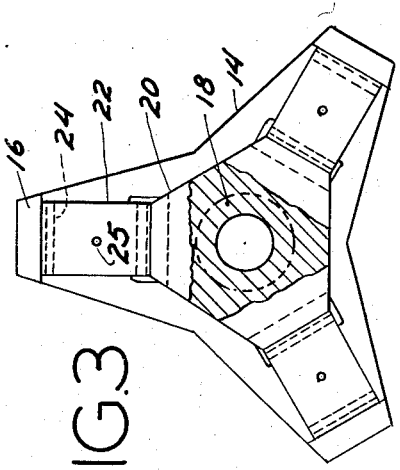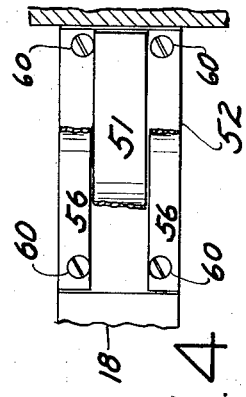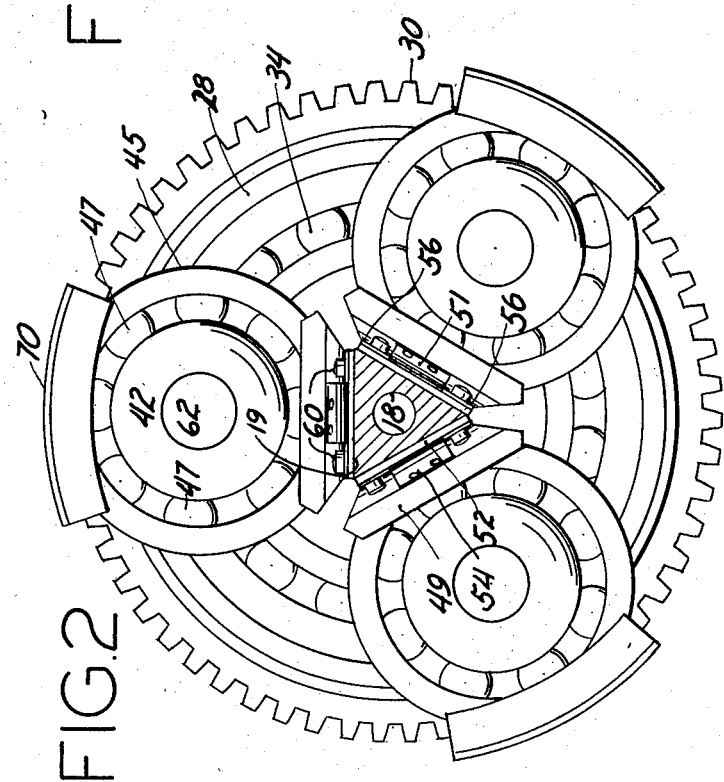
CHARLES W. CHILLSON & EDWARD K. HINE, INVENTORS

Nov. 18, 1958  E. K. HINE ET AL  2,860,530
BALL SPEED CHANGERS
Filed Oct. 29, 1954  3 Sheets-Sheet 3

INVENTORS
CHARLES W. CHILLSON &
EDWARD K. HINE
BY Godfrey B. Speir
ATTORNEY

United States Patent Office 2,860,530
Patented Nov. 18, 1958

2,860,530

BALL SPEED CHANGERS

Edward K. Hine, North Caldwell, and Charles W. Chillson, Packanack Lake, N. J., assignors to Curtiss-Wright Corporation, a corporation of Delaware Application October 29, 1954, Serial No. 465,500

19 Claims. (Cl. 74—796)

This invention relates to speed changers of the infinitely variable ratio type, wherein the speed of a driven member may be varied with respect to the speed of a driving member in infinitely small steps.

In the present invention, in a preferred series of embodiments, a driving shaft rotates a spider or its equivalent which carries a plurality of rotational elements offset from the shaft axis. Such elements rotate on axes passing through their centers and the axes are tiltable to enable ratio change. Annular race members engage spherical surface portions of the rotational elements, one of these members comprising a reaction member and the other an output member. Means are provided to load the annular races into firm frictional engagement with the rotational elements. The arrangement for tilting the axes of the rotational elements is such that extremely light control forces are required to change the transmission ratio. This advantage is secured by applying ratio change control forces in a direction at right angles to the direction of the power transmission, whereby there is substantially no interaction or feed-back between the power force and the control force.

Figure 6:
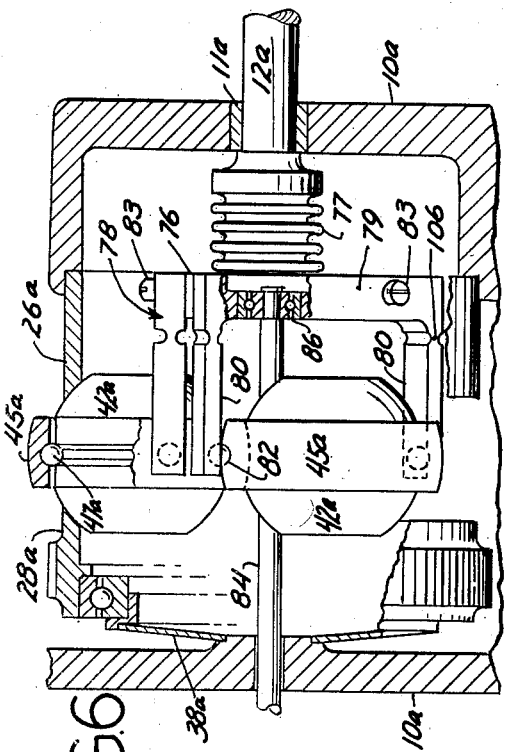
Figure 8:
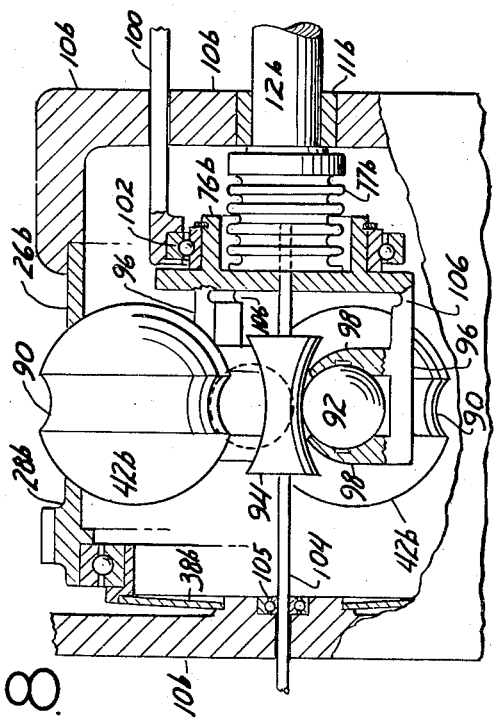
Figure 5:
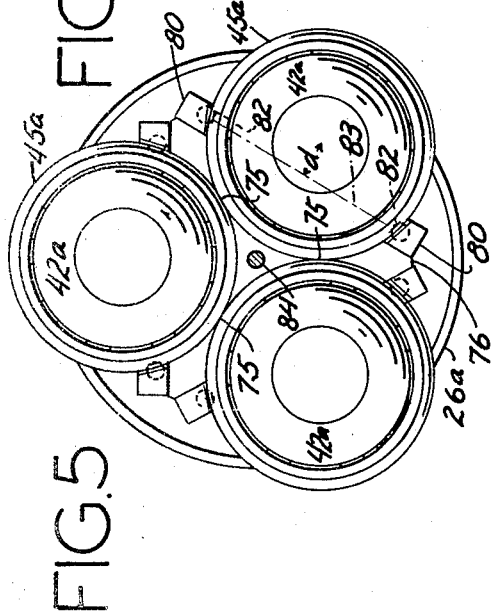
Figure 7:
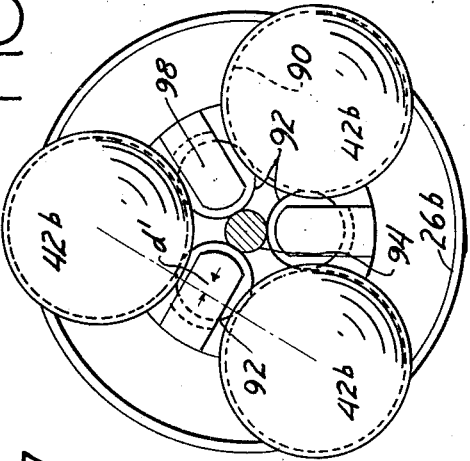

Objects of the invention are to provide an infinitely variable speed changing mechanism requiring very small control forces but capable of transmitting high levels of torque or power and to provide a speed changer which lends itself to high precision fabrication without undue cost. Further objects of the invention will become apparent in following the ensuing detailed description in connection with the drawings, wherein similar reference characters designate similar parts, and wherein:

Fig. 1 is a longitudinal section through a preferred embodiment of the invention, Fig. 2 is a section on a line 2—2 of Fig. 1, Fig. 3 is a section on the line 3—3 of Fig. 1, Fig. 4 is a section on the line 4—4 of Fig. 1, Fig. 5 is a transverse section through a portion of an alternative embodiment of the invention, Fig. 6 is a fragmentary longitudinal section through the Fig. 5 embodiment, Fig. 7 is a transverse section through another alternative embodiment of the invention, and Fig. 8 is a fragmentary longitudinal section through the Fig. 7 embodiment.

Referring first to Figs. 1-4, we provide a housing 10 which is provided with a bearing 11 carrying an input shaft 12, the leftward end of the latter terminating in a three-prong spider 14 having projections 16 extending therefrom. The inside surfaces of the projections 16 are flat and lie parallel to the axis of the shaft 12. A central shaft 18 is coaxial with the shaft 12 and in its mid-portion has the cross section of an equilateral triangle as shown in Fig. 2 defining three flat surfaces 19. The right end of the shaft 18 carries three flat platforms 20 which underlie the projections 16. The shafts 12 and 18 are secured to one another for joint rotation but for free axial relative movement by flexible straps or ribbons 22 whose ends are secured to elements 16 and 20 as by screws 23 and whose mid-portions are circularly curved and held in proper position by circularly curved stiff guides 24 secured thereto as by rivets 25. As the shaft 18 is moved along its axis, the ribbons or straps 22 roll and unroll on the flat portions of the elements 16 and 20 with substantially zero friction, but rotational driving torque is transmitted by the straps from the member 12 to the member 18 without lost motion or backlash. Other arrangements than straps 22 may be used to provide a solid drive with relative axial freedom between shafts 18 and 12.

The housing 10 is provided with an annular race member 26 which is non-rotative and coaxial with the shaft 12. Another annular race member 28, preferably of the same diameter, faces the member 26 and is free to rotate. It may be provided with a gear 30 on its periphery to drive an output pinion 31 on a shaft 32 borne in the housing 10. The race member 28 is mounted on an anti-friction bearing 34 supported by an adapter 36 fitted to a Belleville washer 38 whose other edge is fitted to the housing 10 at 40. The washer 38 serves to urge the race member 28 toward the race member 26 and into firm engagement with a transmission arrangement, now to be described.

There are three rotational transmission elements 42, each having a peripheral groove 43 therearound which defines an axis of rotation for the element normal to the plane of the groove 43. The elements 42 each have spherical surface portions 41 and 41'. The spherical surface portions are disposed on opposite sides of the groove, as shown, and have a common center which is at the center of the element. Each element 42 is embraced by a shroud race 45 which is internally grooved to accommodate small bearing balls 47, these balls also engaging the race groove 43. Each shroud race 45 is furnished at its inner portion adjacent the shaft 18 with a shoe 49 shaped to roll in an axial direction on one of the flat surfaces 19. The shoe 49 may be formed as a part of the shroud race 45 or may be attached thereto by any suitable means.

It will be seen that the inner face of the shoe 49 is of cylindrical form, the radius of the inner cylindrical face being struck from a line through the center of element 42 parallel to the flat 19 on the shaft 18 and transverse to the axis of the shaft 18. The shoe 49 is secured to the shaft 18 so that it may roll thereon in a longitudinal direction and so that it may be driven by the shaft 18.

The attachment of the shoe to the shaft preferably comprises a plurality of thin metallic straps or ribbons. A central ribbon 51 (Fig. 4) is secured at its rightward end to a plate 52, extending along the plate in a leftward direction and rolling up around the bottom of the shoe 49 to be secured to the leftward end thereof by pins 54. Straps 56 lie on either side of the strap 51 and are secured to the leftward end of the plate 52, extending to the right and along the plate and upwardly around the rightward end of the shoe 49 to be secured thereto by pins 58. The plate 52, the straps 51 and 56 and the bearing and shroud race assembly are fabricated as a sub-assembly to enable the straps 51 and 56 to be placed in tension while holding the elements in alignment. The plates 52 with the assembled components may then be secured to the flats 19 of the shaft 18 as by screws 60 at which time the several elements 42 are aligned so that the central planes of the race grooves 43 lie exactly in a plane normal to the axis of the shaft 18. Alternatively, they are aligned so that the axes of the rotational elements each lie in a plane including the axis of shaft 18 and make the same angle with the shaft axis.

The latter assembly step must be accomplished with great precision and as one way of accomplishing it, the elements 42 when manufactured are provided with flats 62 precisely parallel to the planes of the grooves 43 and equidistant from the centers of the elements. During the assembly process flat alignment plates, not shown, are clamped on each side of the several elements 42 engaging the flats 62 whereby the several elements are held in proper alignment. While so held the screws 60 are engaged and tightened after which the alignment plates may be removed leaving the elements 42 in proper alignment for subsequent holding by means of the several straps 51 and 56. The straps 51 and 56 may be secured to plates 52 by soldering.

The spherical surfaces 41 and 41' of the elements 42 are engaged with race members 26 and 28 respectively which, because of the force exerted by spring 38, hold the element assemblies and shoe 49 in intimate contact with the shaft 18 and hold the element centers at a fixed axial location in the assembly. It will be seen that the diameters of members 26 and 28 are greater than the diameter of the circle intersecting the centers of elements 42.

The shaft 18 at its leftward end, has a thrust bearing 64 engaged with an adapter 66 secured to a shifter rod 68. By rightward and leftward movement of the rod 68, the shaft 18 acquires similar axial movement whereby the rotational elements 42, through their connection with the shaft 18, are caused to tilt at various angles. All elements 42 tilt the same amount and in the same sense. The tilt of the elements determines the drive ratio between the power input shaft 12 and the output race member 28.

In the position shown in Fig. 1, wherein the spin axes of the rotational elements are parallel to the axis of shaft 18, the output member 28 has zero rotation since the reaction member 26 does not rotate. As the shaft 12 rotates the shroud races 45 are driven by the shaft 18 and the elements rotate in the shroud races on their own axes at relatively high speed as a result of their engagement with the reaction member 26. When the axes of elements 42 are parallel to the shaft axis, the radial distance from the contact point of the element with the member 26, to the axis of said element, is the same as the radial distance of the contact point of the element with the race member 28, to the axis of the element, whereby the race member 28 does not rotate since the member 26 does not rotate. However, when the axis of each element is tilted out of parallel with the axis of the shaft 18, the radii from the race member contacts with the element 42 to the axis thereof are different from one another, whereby a driving rotation is imparted to the member 28 at a speed and in a direction depending upon the degree and sense of tilt of the axis relative to the shaft 18. This direction and degree of tilt are controlled by the shifting rod 68.

It will be seen that driving effort from the shaft 12 to the race member 28 is always in a tangential direction whereas ratio shifting effort is applied only in an axial direction. Because of this, there is no feed back or coupling between the driving forces and the force required to shift ratio. This advantage is further augmented by the driving ribbons 22 between the shafts 12 and 18, these enabling the transmission of driving force between the members while also enabling free axial shifting of the shafts relative to each other.

In the arrangement as described, the shaft 18 is the driving member as well as the shifting member. The race member 26 is a reaction member and the race 28 is a driven member. These three components may be transposed as requirements dictate. For instance, the shaft 18 could be utilized as a shifting and reaction member, the race member 26 may become the driving member while the race member 28 remains a driven member. Alternatively, the member 28 could become a driving member and the shaft 18 a driven and shifting member.

The outer portions of the shroud race 45 may be provided with counterweights 70 to stabilize the system for high speed operation and further, the counterweights 70 can be provided with off-center masses 72 which, under the influence of centrifugal forces, might urge the tiltable axes of the elements 42 away from parallelism with the axis of the shaft 18. By suitable design of such masses 72, the system could be adapted as a self-contained speed governor, wherein the tendency to tilt the axes of the elements 42 could be offset by a speeder spring, not shown, acting on the shaft adapter 66.

Reference may now be made to Figs. 5 and 6 showing an alternative arrangement of the invention. Components in these figures which have structural and functional similarity to those of the first embodiment bear the same reference characters with the letter "a" following. Herein, the shroud races 45a are exteriorly spherically formed about the centers of their respective rotational elements. As shown in Fig. 5, these shroud races contact and roll longitudinally on one another at points 75 to provide reaction against the contacts of the races 26a and 28a with the elements 42a. The power input shaft 12a drives a spider 76 through a bellows 77 or other suitable mechanism such as the straps 22 of Fig. 1, whereby the spider rotates with the shaft 12a but is free to move axially relative thereto. The spider 76, which is triangular in form, has secured thereto three yokes 78 having central portions 79 secured to the spider and arms 80 extending axially and embracing the shroud races 45a. Connection of arms 80 to the shroud races 45a may be accomplished by pivots, shown as balls 82 engaging recesses formed in the arms and in the shroud races 45a. For any one shroud race, as shown in Fig. 5, the arms 80 lie opposite one another, the balls 82 engaging the shroud races along a line 83 which is spaced inwardly from the center of the elements 42a as shown by the dimension "d." This distance "d" provides a moment arm to enable tilt of the shroud races and of the contained elements 42a for ratio change of the transmission. Also, the spacing of the balls 82 from one another, on opposite sides of the shroud race, provides stabilization of the shroud race so that all shroud races are prevented from tilting in any direction except the tilt required for ratio change. Alignment of the elements 42a and shroud races is accomplished by adjustment of the yokes 78 on the spider 76, through screws 83.

A ratio shifting control rod 84 may pass centrally through the mechanism between the contacting portions of the shroud races 45a to a junction with the spider 76. This junction comprises a ball thrust bearing 86 so that the spider may rotate freely while the shifting rod 84 may remain non-rotative.

A third embodiment of the invention is shown in Figs. 7 and 8. Parts thereof which are similar in structure and function to those parts which are shown in other figures bear the same reference characters with the letter "b" added. Herein, three or any odd number of rotational elements 42b are not provided with shroud races as in the other embodiments, but rather are each formed with a race groove 90 in a plane normal to the axis of rotation of each element 42b. Surfaces of the elements 42b engage the race members 26b and 28b. Three or any appropriate odd number of balls 92 are disposed between the elements 42b and rollably engage the race grooves 90, these balls 92 in turn rollably engaging a freely rotatable spindle 94 coaxial with the shaft 12b but rotatable relative thereto. The spindle 94, as shown in Fig. 8, has an hour glass shape, the curved elements along the spindle surface being in planes containing the spindle axis and substantially concentric with the centers of the elements 42b. By this arrangement, the elements 42b may tilt for ratio change of the speed changer and the balls 92 will roll along as well as around the spindle 94. By virtue of the three balls 92, each of which engages two of the elements 42b, the latter are held in perfect alignment with one another so long as at least one of the balls 92 is constrained against movement in the direction of the axis of rotation of the shaft 12b. Driving torque is imparted to the system through spider 76b and through arms 96 extending therefrom, the arms 96 having socket parts 98 embracing parts of balls 92, these parts 98 being disposed between the balls 42b. Thus, through the elements 98, the balls 92 are driven around the mechanism axis, causing the elements 42b to rotate bodily therewith about the mechanism axis. The balls 92 are always in rolling engagement with the grooves 90 of the elements 42b and are also in rolling engagement with spindle 94. Elements 42b roll against tracks 26b and 28b. A coupling 77b joins the driving shaft 12b with the spider 76b so that the spider is arranged to rotate with the drive shaft but may move axially relative thereto. This axial movement for ratio changing purposes may be accomplished by a shifting arm 100 engaging the outer race of a ball bearing 102, the inner race of which is secured to the spider 76b.

The spindle 94 is driven at a speed greater than that of the drive shaft 12b and if desired, the spindle may be used to drive some high speed device through a shaft 104. The spindle 94 is held against axial shifting by a thrust bearing 105 in the housing 10b engaging the shaft 104. The centers of balls 92 are disposed toward the main axis of the mechanism by a distance "$d^1$" from a line joining the centers of adjacent elements 42b. This distance $d^1$ provides a moment arm whereby the elements 42b are tilted for ratio change. Further, since the balls 92 are spaced apart and lie inwardly of a line joining the centers of the adjacent elements 42b, they assume the loading imposed by the elements 42b as a result of contact pressure on the elements 42b with the race members 26b and 28b, and stabilize the elements 42b against tilt in any direction except that required for ratio change.

It may be noted that the arms 80 in Fig. 6 and also the arms 96 in Fig. 8 are reduced in section as at 106 to endow them with radial resilience allowing them to yield to compensate for the very slight in and out movement of the balls and the pivots during ratio change. These arms assume driving, shifting and guiding loads so must be rigid in tangential and axial directions.

While preferred embodiments of the invention have been shown and described, it is to be understood that changes and modifications may be made therein without departing from the spirit or scope of the invention. Reference should be made to the following claims for a definition of the limits of the invention.

We claim:

1. A speed changer comprising opposed, coaxial annular track members, a rotational member eccentric to the axis of said track members and lying therebetween, said rotational member having portions defining spherical surfaces in frictional engagement with said track members, means engaging the surface of said rotational member adjacent the axis of said track members preventing inward movement thereof, means loading said track members toward one another into engagement with the rotational member, a grooved track formed on the rotational member between said spherical surfaces defining a rotation axis for the rotational member normal to the groove, and means engaging said grooved track axially movable to tilt the rotation axis relative to the axis of said track members.

2. A speed changer according to claim 1 including a shroud race embracing said grooved track and bearing means between the race and track, including three rotational members, and wherein each rotational member has a planar reference area parallel to and equally spaced from said grooved track, said rotational members on assembly being engageable with a flat alinement plate contacting said reference areas.

3. A speed changer according to claim 2 including a member coaxial with the axis of said track members and a shoe having a curved surface concentric with said spherical surfaces engaging said coaxial member.

4. A speed changer comprising opposed, coaxial annular track members, a rotational member therebetween having a race groove defining a rotation axis for said rotational member disposed between the axis of said track members and said track members, means engaging said race groove for guiding said rotational member and for tilting said rotation axis relative to said track member axis, means for holding said rotational member from inward movement toward the track member axis and means to load said track members toward one another and into frictional engagement with the surface of said rotational member.

5. A speed changer according to claim 4, wherein, of said two track members and said means for loading the track members, one comprises a driving member, one a driven member and one a reaction member.

6. A speed changer according to claim 4 wherein said guiding and tilting means comprises a shroud race embracing said rotational member and in bearing relation to the race groove thereof, and wherein said shroud race is connected to said holding means, said holding means being axially movable for tilting said shroud race and being rotationally drivable to drive said shroud race rotationally.

7. A speed changer according to claim 6 wherein said connection comprises flexible metallic ribbons.

8. A speed changer according to claim 4 wherein said guiding and tilting means comprises balls engaging said race groove, and a rotationally drivable and axially shiftable yoke engaging said balls.

9. A speed changer according to claim 4 wherein there are three said rotational members substantially equally spaced around said track member axis, and wherein said guiding and tilting means comprises balls between and engaging the race grooves of adjacent rotational members, and a rotationally drivable and axilly shiftable yoke engaging said balls.

10. A speed changer according to claim 9 wherein the means for holding the rotational members from inward movement comprises a round rotatable central stem engaging said balls and coaxial with said race members.

11. A speed changer according to claim 4 wherein there are three said rotational members, and wherein said race groove engaging means comprises a shroud race for each rotational member having bearing engagement with the race groove thereof.

12. A speed changer according to claim 11 wherein said shroud races are externally spherical and concentric with the spherical surfaces of respective rotational members, said shroud races engaging each other as the means for holding the rotational members from inward movement.

13. A speed changer according to claim 12 wherein said guiding and tilting means for said rotational members comprises a plurality of jointly axially shiftable and rotationally drivable yokes, said yokes respectively being pivotally connected to the shroud races of said rotational members.

14. A speed changer according to claim 4 wherein there are three said rotational members, and wherein said race groove engaging means comprises a shroud race for each ball having bearing engagement with the race groove thereof, a curved shoe on the inner part of each shroud race, a triangular shaft coaxial with said track members and engaged with respective shoes, means to constrain said shoes for axial movement and rotation with said shaft, means to rotate said shaft, and means to move said shaft axially to tilt said rotational members and change speed changer driver ratio.

15. A speed changer comprising a central rotatable and axially movable drive shaft of polygonal cross section, a rocker shoe secured to each face of said shaft for rotation therewith and for longitudinal rocking as said shaft is shifted axially, a shroud race secured to each shoe whose plane lies generally transverse to the axis of said shaft, spherically surfaced members, one borne in each shroud race for rotation therein on an axis defined by the shroud race axis, annular races concentric with the shaft axis, one annular race lying on one side of said shroud races and engaging portions of said spherically surfaced members, and the other annular race lying on the other side of said shroud races and engaging other portions of said spherically surfaced members, means to urge said annular races toward one another into firm engagement with said spherically surfaced members, a power take-off driven by one annular race, and means to restrain the other annular race from rotation.

16. A speed changer according to claim 15 wherein the curve of each rocker shoe is a segment of a circular cylinder having an axis coincident with the center of the associated shroud race, and including a drive member connected to said drive shaft, connected for rotation therewith and for axial movement relative thereto.

17. A speed changer comprising opposed coaxial annular track members, a rotational element therebetween with its center disposed at a different distance from the track member's axis than said track members, said element having an annular groove formed threrein defining an annular bearing race, a guide member having annular bearing relation with the annular groove of said element, said element and guide member being in mutually supporting relation thereby establishing a specific axis of rotation for the rotational element, and means to support and to tilt jointly said guide member and said element.

18. A speed changer according to claim 17 including a member to constrain said rotational element and guide member to desired rotation jointly about the axis of said track members.

19. A speed changer according to claim 18 wherein one of said annular and constraining members is a driving member, one a driven member and the third a reaction member.

References Cited in the file of this patent

UNITED STATES PATENTS

| | | |
|---|---|---|
| 1,611,459 | Khatunzeff | Dec. 21, 1926 |
| 1,847,027 | Thomsen et al. | Feb. 23, 1932 |
| 2,359,540 | Bade | Oct. 3, 1944 |
| 2,535,028 | Arter | Dec. 26, 1950 |